No. 739,755. PATENTED SEPT. 22, 1903.
J. H. MARTIN & D. ORMAND.
WATER GATE.
APPLICATION FILED AUG. 22, 1901.
NO MODEL.
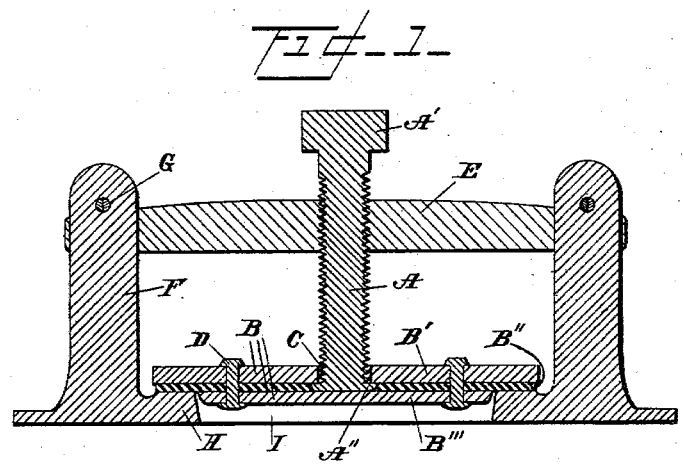
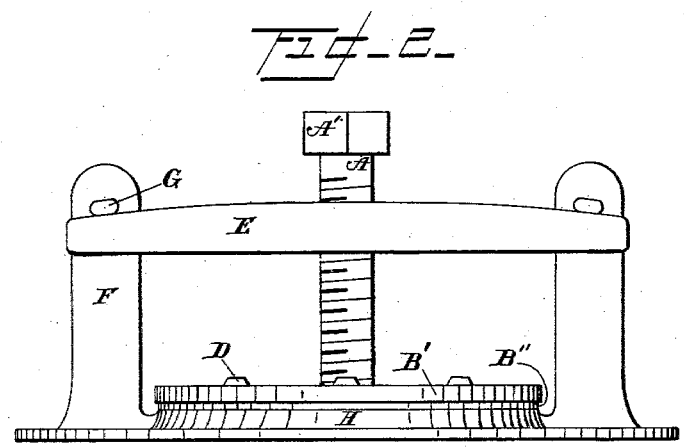
WITNESSES
Chas. L. Hyde.
Mattie McGinnis
INVENTORS
David Ormand
Joseph H. Martin
BY THEIR ATTORNEYS
Hazard & Harpham No. 739,755. Patented September 22, 1903.

UNITED STATES PATENT OFFICE.

JOSEPH H. MARTIN AND DAVID ORMAND, OF RIVERSIDE, CALIFORNIA.

WATER-GATE.

SPECIFICATION forming part of Letters Patent No. 739,755, dated September 22, 1903.

Application filed August 22, 1901. Serial No. 72,934. (No model.)

*To all whom it may concern:*

Be it known that we, JOSEPH H. MARTIN and DAVID ORMAND, citizens of the United States, residing at Riverside, in the county of Riverside, State of California, have invented new and useful Improvements in Water-Gates, of which the following is a specification.

Our invention relates to gates to control the flow of water from outlets on an irrigating pipe-line; and the object thereof is to provide a gate of simple construction, which can easily be firmly seated or unseated and can be easily removed from its seat for repairs. We accomplish this object by the gate described herein and illustrated in the accompanying drawings, in which—

Figure 1 is a central vertical section of a gate embodying our invention, taken on the line which bisects the uprights F. Fig. 2 is a side view of our gate removed from the pipe.

Gates used for this purpose are, so far as we are aware, made with the gate and gate-operating stem rigidly secured together and with a gasket affixed to the lower side of the gate, which contacts with and rubs against the gate-seat when the gate is being closed, creating great friction thereby between these parts, rendering it exceedingly difficult to tightly seat the gate, causing considerable wear on the gasket, and requiring its frequent renewal to keep it water-tight. We obviate these objections by the improvement herein shown and described.

In the drawings, A is the gate-operating stem, having a square or octagonal head A' for the reception of a wrench, which stem is rotatively mounted on the gate B. This gate is composed of the upper plate B', gasket B'', and gasket-holding plate B''', which last plate is of less diameter than the gasket and top plate.

The lower end of the gate-operating stem passes through a hole C in the top plate of the gate and is enlarged at A'' to prevent its withdrawal through the top plate and at the same time to permit its rotation without rotating the gate. A gasket B'' is then placed between the top and bottom plates. These plates are then riveted together by rivets D, which pass through the gasket as well. The threaded gate-stem is passed through a threaded opening in bar E, which is removably connected to upright supports F, a hole being provided in each end of said bar, through which pass said supports. It is held thereon by cotter-pins G. By this construction when the gasket becomes worn and must be replaced, or if any other repairs are required, the gate can be removed from its seat by simply removing the cotter-pins, and after the repairs have been made the gate can be returned to its seat and quickly secured by reinserting the cotter-pins. I is the aperture through the gate-seat H, through which the water flows when the gate is open. This seat is adapted to be fastened upon the outside of the irrigating-pipe. (Not shown.) It will be observed by our construction that the gate-operating stem may be rotated independently of the gate and that the gate may be raised off or seated firmly on its seat without its being rotated, and thereby all wear occasioned by the usual rotation of the gate on its seat is prevented and the usefulness of the gasket prolonged thereby, enabling us to more firmly seat the gate than if the gate rotated while being seated.

Having described our invention, what we claim as new, and desire to secure by Letters Patent, is—

1. In a water-gate, the combination with an apertured base provided with a valve-seat, of a plurality of upright supports, an apertured cross-bar received thereon, means for removably securing the cross-bar on the uprights, the cross-bar provided with a threaded opening, a headed screw carried therein, the lower end of the screw being enlarged, a valve located on the valve-seat, the valve comprising an apertured upper plate received on the screw, a solid plate of less diameter than the upper plate, a gasket located between the two plates, the enlarged end of the screw passing through the gasket and resting upon the solid lower plate and means passing transversely through the plates and gasket to secure them together.

2. In a water-gate, the combination with an apertured base provided with a valve-seat, of a valve comprising a solid lower plate, received within the valve-opening, a gasket of larger diameter than the lower plate and resting on the valve-seat, an upper apertured plate superposed upon the gasket and of approximately the same size, means passing transversely through the plates and gasket to retain them together, a stem passing through the aperture in the upper plate and through the gasket, the stem resting upon the solid lower plate, and means for feeding the stem and valve to and from the valve-seat.

In witness that we claim the foregoing we have hereunto subscribed our names this 15th day of August, 1901.

JOSEPH H. MARTIN.
DAVID ORMAND.

Witnesses:
J. L. TUMMOND,
ARTHUR CLARENCE BURNHAM.